No. 890,201.
PATENTED JUNE 9, 1908.
J. TROUT.
TROLLEY REPLACER.
APPLICATION FILED JULY 11, 1907.
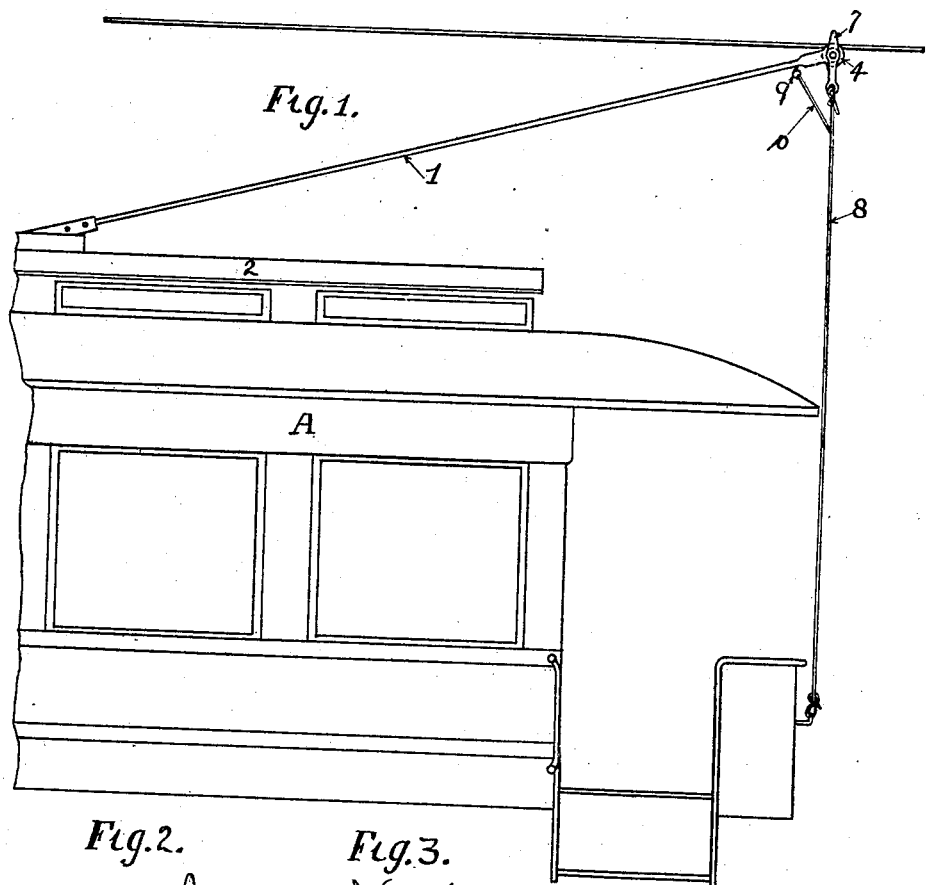
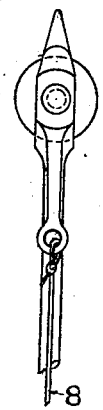
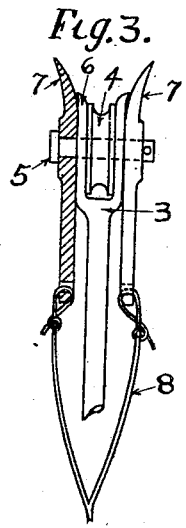
Witnesses
Jno. W. Dady
N. D. Phillips
Inventor
John Trout
per
Joshua R. H. Potts
Attorney

UNITED STATES PATENT OFFICE.

JOHN TROUT, OF PHILADELPHIA, PENNSYLVANIA.

TROLLEY-REPLACER.

No. 890,201.　　　　Specification of Letters Patent.　　　Patented June 9, 1908.

Application filed July 11, 1907. Serial No. 383,336.

*To all whom it may concern:*

Be it known that I, JOHN TROUT, a citizen of the United States, residing at Philadelphia, in the county of Philadelphia and State of Pennsylvania, have invented certain new and useful Improvements in a Trolley-Replacer, of which the following is a specification.

This invention relates to trolley replacers of that type with downwardly extending parts or horns that serve to return the overhead wire to the trolley in the event of the wire becoming detached from the trolley.

The invention has for one of its objects to improve and simplify the construction and operation of devices of this character so as to be comparatively easy and inexpensive to manufacture, and durable and effective in service.

A further object of the invention is the provision of a trolley retriever having independently movable horns disposed on opposite sides of the harp and fulcrumed on the shaft of the trolley, the horns or members being independently movable so as to pass under the cross wires of the overhead suspension.

With these objects in view and others as will appear as the description proceeds, the invention comprises the various novel features of construction and arrangement of parts which will be more fully described hereinafter and set forth with particularity in the claim appended hereto.

In the accompanying drawing which illustrates one of the embodiments of the invention, Figure 1 is a side elevation of a portion of an electric car having the trolley replacer applied thereon. Fig. 2 is a side elevation of a trolley replacer drawn on an enlarged scale. Fig. 3 is a front view partially in section.

Referring to the drawing A designates generally an electric car having a trolley pole 1, on the roof 2, the upper end of the pole being provided with a harp 3 in which is mounted a trolley 4 arranged to rotate on the shaft or arbor. The arms on the harp extend to the top of the trolley wheel and are beveled away from the flanges of the wheel as at 6 in Fig. 3. At the opposite side of the harp are arranged members or horns 7 that have their upper ends beveled in line with the bevels 6. These members are loosely fulcrumed on the arbor 5 and have their lower ends connected by a crotched rope 8 and pass down as usual to the rear platform so as to be in convenient reach of the conductor. Between the rope 8 at the bottom of the crotched or V shaped portion thereof is an eye 9 on the trolley pole with the other rope or flexible connection 10 that serves as an emergency device to prevent loss of control of the pole should the branch portions of the rope fail.

In practice the weight of the rope serves to hold the replacing member 7 in an upright position so as to prevent the overhead wire from passing off the trolley and when the trolley passes under a cross wire, the members 7 will be swung forwardly and ride under the cross wire without shock. The replacing members or horns 7 are mounted to swing independently so that either one can be depressed upon encountering the wire only on one side of the trolley wire.

From the foregoing description taken in connection with the accompanying drawing the advantages of the construction and of the method of operation will be readily apparent to those skilled in the art to which the invention appertains and while I have described the principle of operation of the invention together with the device which I now consider to be the best embodiment thereof I desire to have it understood that the device shown is merely illustrative and that such changes may be made when desired as are within the scope of the claim.

Having thus described my invention what I claim is:

A trolley replacer comprising a pole, with a harp, a shaft extending through the arms of said harp, a trolley wheel mounted in the harp on said shaft, the ends of the arms of the harp being beveled inwardly and downwardly, and extending up above the top of said wheel horns mounted on said shaft outside of the arms of the harp; the upper ends of the said horns being bent outwardly and having their inner faces beveled inwardly and downwardly, a rope connected to the lower ends of said horns and a flexible connection between said rope and pole, for the purpose set forth.

In testimony whereof I have signed my name to this specification in the presence of the two subscribing witnesses.

JOHN TROUT.

Witnesses:
　JOHN CURTIN,
　W. EISENHOUR.